US012720280B2

(12) United States Patent
Onishi

(10) Patent No.: US 12,720,280 B2
(45) Date of Patent: Aug. 25, 2026

(54) DATA PROCESSING DEVICE AND METHOD THAT USES CHANGE POINTS OF SERIES TO IDENTIFY A TARGET

(71) Applicant: NEC Corporation, Tokyo (JP)

(72) Inventor: Takeo Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 334 days.

(21) Appl. No.: 18/562,109

(22) PCT Filed: May 25, 2021

(86) PCT No.: PCT/JP2021/019734
§ 371 (c)(1),
(2) Date: Nov. 17, 2023

(87) PCT Pub. No.: WO2022/249269
PCT Pub. Date: Dec. 1, 2022

(65) Prior Publication Data

US 2024/0276178 A1 Aug. 15, 2024

(51) Int. Cl.
*H04W 4/029* (2018.01)

(52) U.S. Cl.
CPC .................................. *H04W 4/029* (2018.02)

(58) Field of Classification Search
None
See application file for complete search history.

(56) References Cited

U.S. PATENT DOCUMENTS

| | | | | |
|---|---|---|---|---|
| 6,445,409 B1 * | 9/2002 | Ito | G08B 13/1961 348/E7.086 |
| 2005/0206726 A1 * | 9/2005 | Yoshida | H04N 7/181 348/143 |
| 2009/0009598 A1 * | 1/2009 | Sotodate | H04N 7/183 386/E5.005 |
| 2009/0059002 A1 * | 3/2009 | Kim | G08B 13/19671 348/143 |

(Continued)

FOREIGN PATENT DOCUMENTS

| | | |
|---|---|---|
| JP | 2003-111130 A | 4/2003 |
| JP | 2011-180684 A | 9/2011 |

(Continued)

OTHER PUBLICATIONS

International Search Report for PCT Application No. PCT/JP2021/019734, mailed on Aug. 10, 2021.

*Primary Examiner* — Adolf Dsouza
(74) *Attorney, Agent, or Firm* — Sughrue Mion, PLLC

(57) ABSTRACT

A data processing device (10) includes: a detection unit (11) that detects change points of a first data series including a first identifier and change points of a second data series including a second identifier; a calculation unit (12) that calculates an occurrence probability that the change points of the first data series and the change points of the second data series occur in synchronization with each other; an association unit (13) that associates the first identifier and the second identifier as identifiers related to a tracing target on the basis of the occurrence probability; and a determination unit (14) that determines a type of an identification target of the associated first or second identifier on the basis of the occurrence probability.

18 Claims, 12 Drawing Sheets

(56) References Cited

U.S. PATENT DOCUMENTS

2010/0260379 A1* 10/2010 Yokohata ................ G06T 7/248
382/103
2012/0062732 A1* 3/2012 Marman ................ G06T 7/277
348/142
2013/0050502 A1* 2/2013 Saito ........................ G06T 7/20
348/169
2015/0248751 A1* 9/2015 Ebiyama ................ G06T 7/292
382/294

FOREIGN PATENT DOCUMENTS

JP 2013-251800 A 12/2013
JP 2015-125575 A 7/2015
JP 2016-212675 A 12/2016
JP 2017-138708 A 8/2017
JP 2018-005474 A 1/2018
JP 2021033430 A * 3/2021 ............. H04N 23/60
WO 2016/129093 A1 8/2016

* cited by examiner

100
DATA ACCUMULATION UNIT
101
CHANGE POINT DETECTION UNIT
102
DETECTION METHOD SELECTION UNIT
103
IDENTIFIER ASSOCIATION UNIT
104
TERMINAL TYPE DETERMINATION UNIT
105

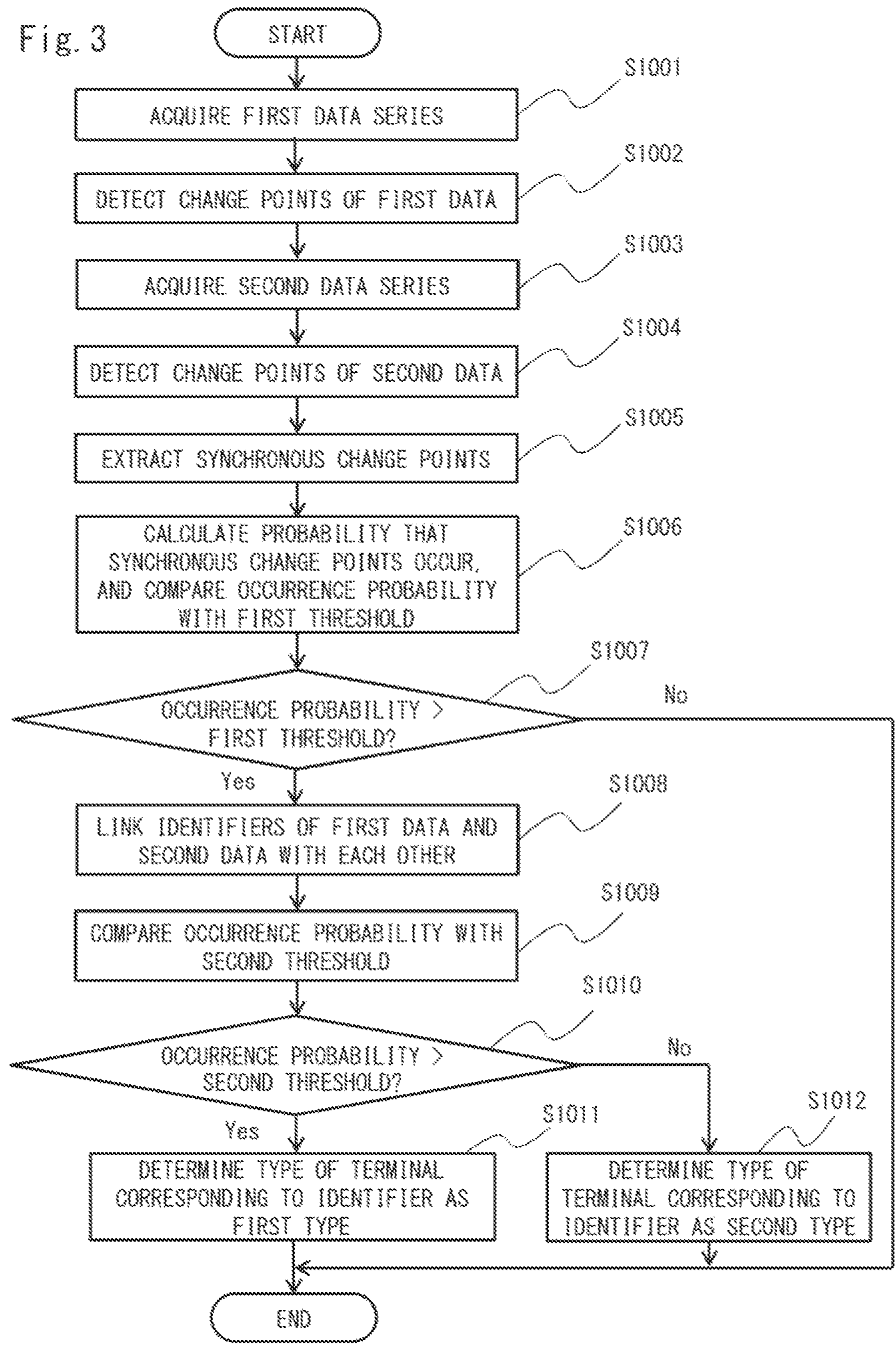
Fig. 3
START
S1001
ACQUIRE FIRST DATA SERIES
S1002
DETECT CHANGE POINTS OF FIRST DATA
S1003
ACQUIRE SECOND DATA SERIES
S1004
DETECT CHANGE POINTS OF SECOND DATA
S1005
EXTRACT SYNCHRONOUS CHANGE POINTS
S1006
CALCULATE PROBABILITY THAT SYNCHRONOUS CHANGE POINTS OCCUR, AND COMPARE OCCURRENCE PROBABILITY WITH FIRST THRESHOLD
S1007
OCCURRENCE PROBABILITY > FIRST THRESHOLD?
No
Yes
S1008
LINK IDENTIFIERS OF FIRST DATA AND SECOND DATA WITH EACH OTHER
S1009
COMPARE OCCURRENCE PROBABILITY WITH SECOND THRESHOLD
S1010
OCCURRENCE PROBABILITY > SECOND THRESHOLD?
No
Yes
S1011
DETERMINE TYPE OF TERMINAL CORRESPONDING TO IDENTIFIER AS FIRST TYPE
S1012
DETERMINE TYPE OF TERMINAL CORRESPONDING TO IDENTIFIER AS SECOND TYPE
END

Fig. 4

| TIME | CAMERA ID | IDENTIFICATION ID |
|---|---|---|
| 1601379161 | C1 | U1 |
| 1601379162 | C1 | U1 |
| 1601379163 | C1 | U1 |
| 1601379311 | C1 | U2 |
| 1601379563 | C1 | U1 |
| 1601379564 | C1 | U1 |
| 1601379565 | C1 | U1 |
| 1601379566 | C1 | U1 |
| | | |

Fig. 5

| TIME | CAMERA ID | IDENTIFICATION ID | CHANGE POINT |
|---|---|---|---|
| 1601379161 | C1 | U1 | |
| 1601379162 | C1 | U1 | |
| 1601379163 | C1 | U1 | LEAVE |
| 1601379311 | C1 | U2 | PASS |
| 1601379563 | C1 | U1 | APPROACH |
| 1601379564 | C1 | U1 | |
| 1601379565 | C1 | U1 | |
| 1601379566 | C1 | U1 | |
| | | | |

Fig. 6

| TIME | POSITION | MAC ADDRESS |
|---|---|---|
| 1601379110 | (10, 10) | AA:BB:CC:DD:EE:FF |
| 1601379120 | (10, 10) | AA:BB:CC:DD:EE:FF |
| 1601379130 | (10, 28) | AA:BB:CC:DD:EE:FF |
| 1601379140 | (10, 28) | AA:BB:CC:DD:EE:FF |
| 1601379150 | (10, 28) | AA:BB:CC:DD:EE:FF |
| 1601379160 | (10, 28) | AA:BB:CC:DD:EE:FF |
| 1601379170 | (10, 10) | AA:BB:CC:DD:EE:FF |
| 1601379180 | (10, 10) | AA:BB:CC:DD:EE:FF |
| | | |

Fig. 8

| TIME | POSITION | MAC ADDRES | CHANGE POINT |
|---|---|---|---|
| 1601379110 | (10, 10) | AA:BB:CC:DD:EE:FF | |
| 1601379120 | (10, 10) | AA:BB:CC:DD:EE:FF | |
| 1601379130 | (10, 28) | AA:BB:CC:DD:EE:FF | APPROACH |
| 1601379140 | (10, 28) | AA:BB:CC:DD:EE:FF | |
| 1601379150 | (10, 28) | AA:BB:CC:DD:EE:FF | |
| 1601379160 | (10, 28) | AA:BB:CC:DD:EE:FF | |
| 1601379170 | (10, 10) | AA:BB:CC:DD:EE:FF | LEAVE |
| 1601379180 | (10, 10) | AA:BB:CC:DD:EE:FF | |
| | | | |

100
DATA ACCUMULATION UNIT
101
CHANGE POINT DETECTION UNIT
102
DETECTION METHOD SELECTION UNIT
103
IDENTIFIER ASSOCIATION UNIT
104
TERMINAL TYPE DETERMINATION UNIT
105
POSITION ESTIMATION UNIT
116

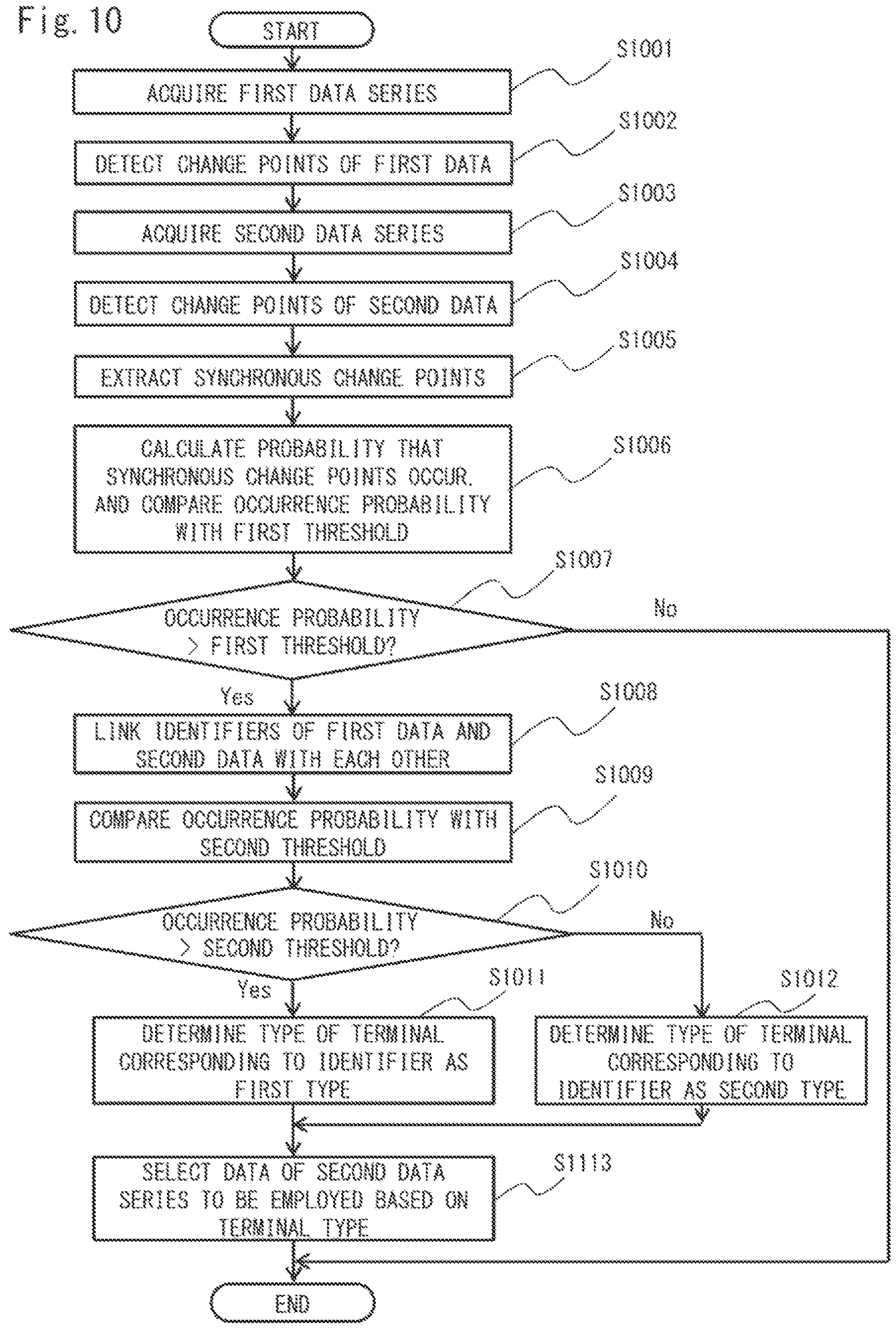
Fig. 10
START
ACQUIRE FIRST DATA SERIES
S1001
DETECT CHANGE POINTS OF FIRST DATA
S1002
ACQUIRE SECOND DATA SERIES
S1003
DETECT CHANGE POINTS OF SECOND DATA
S1004
EXTRACT SYNCHRONOUS CHANGE POINTS
S1005
CALCULATE PROBABILITY THAT SYNCHRONOUS CHANGE POINTS OCCUR, AND COMPARE OCCURRENCE PROBABILITY WITH FIRST THRESHOLD
S1006
OCCURRENCE PROBABILITY > FIRST THRESHOLD?
S1007
No
Yes
LINK IDENTIFIERS OF FIRST DATA AND SECOND DATA WITH EACH OTHER
S1008
COMPARE OCCURRENCE PROBABILITY WITH SECOND THRESHOLD
S1009
OCCURRENCE PROBABILITY > SECOND THRESHOLD?
S1010
No
Yes
DETERMINE TYPE OF TERMINAL CORRESPONDING TO IDENTIFIER AS FIRST TYPE
S1011
DETERMINE TYPE OF TERMINAL CORRESPONDING TO IDENTIFIER AS SECOND TYPE
S1012
SELECT DATA OF SECOND DATA SERIES TO BE EMPLOYED BASED ON TERMINAL TYPE
S1113
END

DATA PROCESSING DEVICE AND METHOD THAT USES CHANGE POINTS OF SERIES TO IDENTIFY A TARGET

This application is a National Stage Entry of PCT/JP2021/019734 filed on May 25, 2021, the contents of all of which are incorporated herein by reference, in their entirety.

TECHNICAL FIELD

The present invention relates to a data processing device, a data processing method, and a non-transitory computer readable medium.

BACKGROUND ART

Various methods have been proposed to obtain and track a position of a user. For example, there is a method in which radio waves emitted from a wireless terminal are observed by a plurality of sensors to estimate a position of a user from the radio wave intensities at the respective positions of the sensors. There is also a method in which a face of a person captured in an image using a camera is identified, and a movement history of the person is acquired with a plurality of cameras. In addition, a method combining these multiple methods has also been proposed.

By combining multiple methods, it is possible to expect advantageous effects such as improvement in position accuracy and coverage, but it is necessary to associate data acquired by different types of sensors. For example, it is necessary to associate a person whose face has been identified using a camera with an identifier of a wireless terminal (e.g., a MAC address or the like of a wireless LAN terminal) observed by a wireless sensor.

As a related art, for example, in Patent Literature 1, in a system that detects a position of a person, data observed by a plurality of types of sensors are associated on the basis of an order of times at which data appear from the plurality of types of sensors. Further, in Patent Literature 2, in an object recognition system, a portable terminal and a moving entity are associated with each other on the basis of comparison between behavior data obtained by detecting a behavior of the portable terminal and estimation history data of the moving entity holding the portable terminal.

In addition, in Patent Literature 3, in a moving object tracking device, a mutual approach state between moving objects is determined on the basis of an overlap between elliptical regions calculated as respective movement destinations of the moving objects. In Patent Literature 4, in an event log tracing device, a relationship between log data is specified. In Patent Literature 5, in order to analyze time-series data of wireless communication services, a change point of traffic is detected.

CITATION LIST

Patent Literature

[Patent Literature 1] Japanese Unexamined Patent Application Publication No. 2003-111130

[Patent Literature 2] Japanese Unexamined Patent Application Publication No. 2016-212675

[Patent Literature 3] Japanese Unexamined Patent Application Publication No. 2011-180684

[Patent Literature 4] International Patent Publication No. WO2016/129093

[Patent Literature 5] Japanese Unexamined Patent Application Publication No. 2017-138708

SUMMARY OF INVENTION

Technical Problem

However, in the related art, there is a possibility that tracing accuracy may deteriorate depending on data associated as a tracing target, an identification target identified by the data, and the like.

In light of such a problem, an object of the present disclosure is to provide a data processing device, a data processing method, and a non-transitory computer readable medium capable of improving tracing accuracy.

Solution to Problem

A data processing device according to the present disclosure includes: a detection means for detecting change points of a first data series including a first identifier and change points of a second data series including a second identifier; a calculation means for calculating an occurrence probability that the change points of the first data series and the change points of the second data series occur in synchronization with each other; an association means for associating the first identifier and the second identifier as identifiers related to a tracing target on the basis of the occurrence probability; and a determination means for determining a type of an identification target of the associated first or second identifier on the basis of the occurrence probability.

A data processing method according to the present disclosure includes: detecting change points of a first data series including a first identifier and change points of a second data series including a second identifier; calculating an occurrence probability that the change points of the first data series and the change points of the second data series occur in synchronization with each other; associating the first identifier and the second identifier as identifiers related to a tracing target on the basis of the occurrence probability; and determining a type of an identification target of the associated first or second identifier on the basis of the occurrence probability.

A non-transitory computer readable medium according to the present disclosure stores a data processing program for causing a computer to execute: detecting change points of a first data series including a first identifier and change points of a second data series including a second identifier; calculating an occurrence probability that the change points of the first data series and the change points of the second data series occur in synchronization with each other; associating the first identifier and the second identifier as identifiers related to a tracing target on the basis of the occurrence probability; and determining a type of an identification target of the associated first or second identifier on the basis of the occurrence probability.

Advantageous Effects of Invention

According to the present disclosure, it is possible to provide a data processing device, a data processing method, and a non-transitory computer readable medium capable of improving tracing accuracy.

BRIEF DESCRIPTION OF DRAWINGS

FIG. 3 is a flowchart illustrating an example of an operation of the data association device according to the first example embodiment.

FIG. 4 is a diagram illustrating a specific example of a first data series according to the first example embodiment.

FIG. 5 is a diagram illustrating a specific example of a first data series according to the first example embodiment.

FIG. 6 is a diagram illustrating a specific example of a second data series according to the first example embodiment.

FIG. 8 is a diagram illustrating a specific example of a second data series according to the first example embodiment.

FIG. 10 is a flowchart illustrating an example of an operation of the data association device according to the second example embodiment.

EXAMPLE EMBODIMENT

Figure 1:
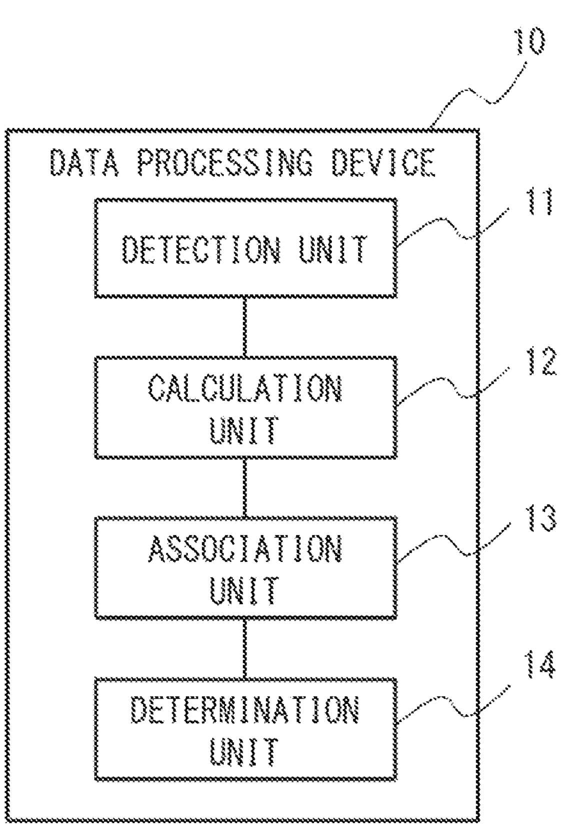
FIG. 1 is a configuration diagram illustrating an outline of a data processing device according to an example embodiment.

Hereinafter, example embodiments will be described with reference to the drawings. In the drawings, the same elements are denoted by the same reference signs, and redundant description will be omitted as necessary.

Review of Related Art

In a related trace system, a short-range wireless sensor is arranged at a gate of a floor or the like, and a wireless terminal owned by a user is detected by the short-range wireless sensor when the user passes through the gate. Further, the user is traced by identifying the user using a camera or the like and detecting a position of the user on the floor after passing through the gate. At that time, in the related trace system, data about the person observed by the camera immediately after the wireless terminal is observed at the gate and data about the wireless terminal are associated with each other as data for the same person (tracing target).

The inventor has studied the related trace system and found the following problems. That is, in the related trace system, there is a problem that, in a case where radio waves emitted from terminals having various characteristics like wireless LAN terminals, such as a notebook personal computer (PC), a tablet, a smartphone, and a smart watch, are used, when the radio waves are associated with another type of sensor data, such as camera data, associating accuracy and tracing accuracy deteriorate.

This is because the observation target (detection target) includes a terminal that is not always carried by the user such as a notebook PC. For example, in a case where the user moves to an imaging range of the camera while placing the notebook PC on a desk or the like, erroneous association is performed in the technology according to the related art. In addition, even if the association can be correctly performed, in a case where the position of the user is traced using a wireless terminal that is less frequently carried when the user moves, the position cannot be correctly traced, resulting in a deterioration in tracing accuracy.

Therefore, in the following example embodiments, in a case where the user owns various types of wireless terminals, it is possible to accurately associate different types of data with each other and accurately trace the position of the user.

Outline of Example Embodiment

FIG. 1 illustrates an outline of a data processing device according to an example embodiment. As illustrated in FIG. 1, the data processing device 10 includes a detection unit 11, a calculation unit 12, an association unit 13, and a determination unit 14.

The detection unit 11 detects change points of a first data series having a first identifier and change points of a second data series having a second identifier. The calculation unit 12 calculates an occurrence probability that the change points of the first data series and the change points of the second data series occur in synchronization with each other. The association unit 13 associates the first identifier and the second identifier as identifiers related to the tracing target on the basis of the occurrence probability. The determination unit 14 determines a type of an identification target having the associated first or second identifier on the basis of the occurrence probability.

This configuration makes it possible to associate the first identifier of the first data series and the second identifier of the second data series with each other with high accuracy, and determine a type of an identification target having the associated first or second identifier, thereby improving tracing accuracy.

For example, in a system that traces a user by combining face recognition using a camera and wireless positioning using a wireless sensor, it is possible to automatically associate a person specified by the camera with a wireless terminal owned by the person. In particular, in a case where a general-purpose wireless terminal such as a smartphone or a notebook PC is used, when a situation in which the user does not necessarily carry the wireless terminal occurs, association can be performed with high accuracy, and a characteristic (the wireless terminal is always carried, the wireless terminal may be left on a desk, etc.) of the wireless terminal can be identified.

First Example Embodiment

Hereinafter, a first example embodiment will be described with reference to the drawings.

Configuration of First Example Embodiment

Figure 2:
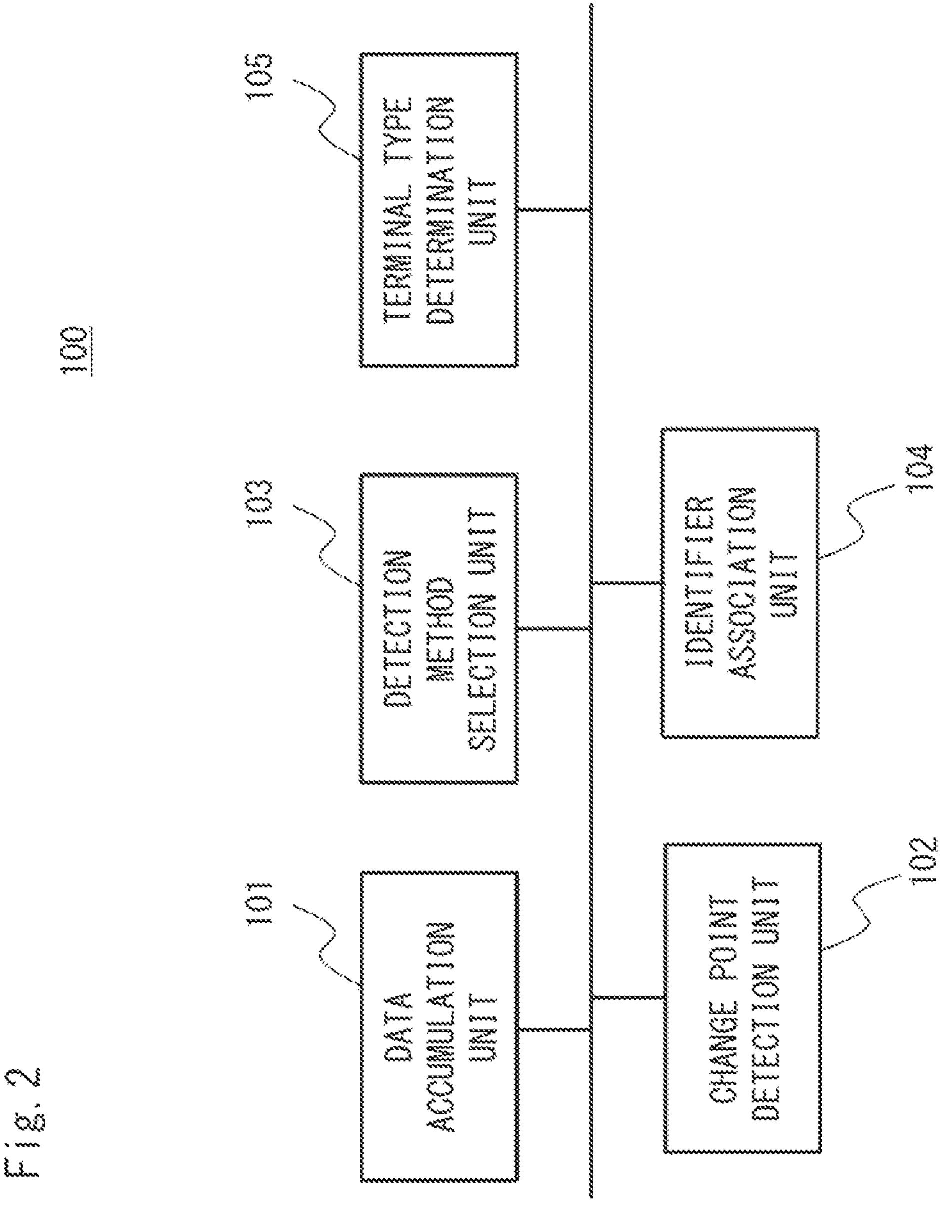
FIG. 2 is a configuration diagram illustrating an example of a configuration of a data association device according to a first example embodiment.

FIG. 2 illustrates an example of a configuration of a data association device according to the present example embodiment. The data association device 100 according to the present example embodiment is a device that associates data (identifier) related to a user as a tracing target in a trace system that traces a position of the user. For example, the trace system includes a data association device 100 and a trace device, and the trace device traces a user on the basis of data associated by the data association device 100. According to the trace system, it is possible to instantaneously specify a position of a person in an office where a free addressing system is implemented, and optimally arrange things by tracing a position of a person in a factory or the like.

As illustrated in FIG. 2, the data association device 100 according to the present example embodiment includes a data accumulation unit 101, a change point detection unit 102, a detection method selection unit 103, an identifier association unit 104, and a terminal type determination unit 105.

The data accumulation unit 101 accumulates data (identifier) associated by the data association device 100. Specifically, the data accumulation unit 101 accumulates data acquired by a plurality of types of sensors for each data type. A plurality of pieces of data for each data type may be referred to as a data series, and for example, the data accumulation unit 101 accumulates data of a first data series and data of a second data series.

The data type is, for example, face identification data obtained by analyzing a camera image, wireless terminal position data estimated by observing a radio wave transmitted from a wireless terminal, or the like. The data accumulated by the data accumulation unit 101 includes, for example, a time at which the data is acquired and an identifier (also referred to as an observation target ID) for uniquely identifying a target observed by the sensor. The observation target ID is, for example, an ID uniquely specifying a person obtained by face identification, a MAC address of a wireless terminal, or the like.

The change point detection unit 102 calculates (detects) a time (change point) at which a change appears in the feature of the data for each data type accumulated in the data accumulation unit 101. The change point detection unit 102 calculates a change point for each data type with respect to data including a plurality of observation target IDs. For example, the change point detection unit 102 detects a change point of the first data series and a change point of the second data series. The change point detection unit 102 detects a time at which the state of time-series data in each data series has changed as a change point. The change in state of time-series data includes a change from a state in which time-series data is not recorded to a state in which time-series data is recorded. For example, in a case where the time-series data are camera images, the change in state of time-series data includes a change from a state in which no person is recognized from a camera image to a state in which a person is recognized from a camera image. Note that the example described here is merely an example, and any change may be used as long as the state of the time-series data changes from one state to another state. For example, in a case where the time-series data is positioning data, the change in state of time-series data may include a change from a state in which the value of the time-series data is out of the specific range to a state in which the value of the time-series data is within the specific range, such as a change from a state in which the positioning data is out of the imaging range of the camera to a state in which the positioning data is within the imaging range of the camera.

As a method of calculating a change point, a different method can be used for each data type, and the change point is calculated on the basis of a method selected by the detection method selection unit 103. The change point detection unit 102 detects a change point of the first data series on the basis of a first detection method corresponding to the first data series, and detects a change point of the second data series on the basis of a second detection method corresponding to the second data series.

The detection method selection unit 103 selects a method of detecting a change point on the basis of the data type, and selects a method of detecting a change point for each set (data series) of data to be analyzed. The detection method selection unit 103 selects a first detection method according to the type of the first data series, and selects a second detection method according to the type of the second data series.

On the basis of the change point of the data for each data type calculated by the change point detection unit 102, the identifier association unit 104 calculates (associates) a set of associated observation target IDs. Here, the calculation of the associated observation target IDs means, for example, calculating a set of a person (identifier) specified by face identification and a MAC address of a wireless terminal held by the person. In other words, the identifier association unit 104 associates a first observation target ID of the first data series with a second observation target ID of the second data series as identifiers related to the person to be traced.

The identifier association unit 104 is also a calculation unit that calculates an occurrence probability that synchronous change points where the change points for the respective data types are synchronized with each other occur. For example, the identifier association unit 104 calculates a probability that synchronous change points occur between the change points of the first data series and the change points of the second data series, and associates a first observation target ID of the first data series and a second observation target ID of the second data series on the basis of the calculated occurrence probability. The occurrence probability is a probability that the change points of the first data series and the change points of the second data series occur within a predetermined time range. The occurrence probability may be calculated by aggregating synchronous change points within the predetermined time range using a certain statistical method. For example, the identifier association unit 104 associates the first observation target ID and the second observation target ID based on a result of comparing the occurrence probability with a first threshold.

The terminal type determination unit 105 determines (determines) a type of an observation target (e.g., a wireless terminal) with the associated observation target ID on the basis of the probability that synchronous change points occur calculated by the identifier association unit 104. The terminal type determination unit 105 determines a type of an identification target corresponding to either the first observation target ID of the associated first data series or the second observation target ID of the associated second data series. The type is determined for an ID including a plurality of types, such as a wireless terminal, among the first observation target ID and the second observation target ID. For example, the terminal type determination unit 105 compares the occurrence probability with a second threshold, and determines the type of the wireless terminal on the basis of a comparison result. For example, on the basis of the occurrence probability, the terminal type determination unit 105 determines whether the type of the terminal linked with the observation target ID is a terminal that is highly frequently carried (a mobile terminal that is carried) such as a smartphone or a terminal that is relatively often left on a desk (a non-mobile terminal that is not carried) such as a notebook PC.

Operation of First Example Embodiment

FIG. 3 is a diagram illustrating an example of an operation of the data association device according to the present example embodiment. As illustrated in FIG. 3, first, the change point detection unit 102 acquires data (first data) of a first data series from the data accumulation unit 101 (step S1001). In the present example, the first data series will be described as data obtained by identifying a face using a specific camera. Note that, for the sake of explanation, the two data series are set as the first data series and the second data series, but any data series may be set as the first data series or the second data series (the same applies to the first identifier and the second identifier or the like) unless otherwise specified.

FIG. 4 is an example of the first data series acquired in step S1001. As illustrated in FIG. 4, in the present example, the first data series is a data group including information on times, camera IDs, and identification IDs. That is, in the first data series, data in which times, camera IDs, and identification IDs are associated with each other are arranged in time series. The time is a time at which face identification is performed, and is described as the number of seconds elapsed from 0:00 on Jan. 1, 1970. In the present example, it is assumed that data is obtained by acquiring an image from the camera and performing face identification at a cycle of one second, and the data is recorded at a cycle of one second when a face is identified, and the data is not recorded when no face is identified, for example, for the reason that no face is captured by the camera. The camera ID is an identifier for uniquely identifying a camera used for face identification. The identification ID (first identifier) is an ID for uniquely identifying a person specified by face identification. For example, it can also be said that the first identifier is an identifier indicating an identification target identified by a predetermined identification process from data for generating a first data series. In this example, the identification process is a process of recognizing an identification target (a face of a person) from an image captured by the camera.

Next, the change point detection unit 102 detects change points of the first data on the basis of a detection method selected by the detection method selection unit 103 (step S1002). Here, since the first data series is face identification data from the camera, the detection method selection unit 103 selects a change point detection method for the face identification data. Here, it is assumed that the selected algorithm is an algorithm for detecting a time at which face identification starts or ends as a change point. In this case, it can also be said that the change in state of data detected as a change point is a change in identification state of the identification target through the identification process. For example, the change in identification state is a change as to whether the identification target is identified by the identification process (an identified state or an unidentified state).

For example, according to the data of FIG. 4, a face is consecutively (every second) identified before the time "1601379163", and thereafter, no face is identified until the time "1601379311", and thus the time "1601379163" is detected as a change point. For example, the change point detection unit 102 detects a time at which the identification ID changes in the first data series as a change point. Specifically, the identification ID is "U1" until the time "1601379163" and the identification ID changes to "U2" at the time "1601379311", the time "1601379163" is set as a change point. Concerning the change point, the change point may have a type. That is, the change point detection unit 102 may detect a change point of data, and determine a change type of the change point according to the change in state of the data. Here, since the face with the identification ID "U1" changes to an unidentified state at the change point of the time "1601379163", the type of the change point is "leave".

In the data of FIG. 4, the face is not identified before the time "1601379563" and thereafter, the state changes to a state in which the face is identified consecutively. Therefore, the time "1601379563" is detected as a change point, and the type of the change point is "approach". Furthermore, focusing on the time "1601379311", since face identification has not been performed before or after the time "1601379311", this indicates a case where a state in which face identification is not performed transitions to a state in which face identification is performed in one cycle, and immediately transitions back to the state in which face identification is not performed, and thus, this is also detected as a change point. The type of the change point is "pass". FIG. 5 is a diagram illustrating an example of a change point detected from the first data series of FIG. 4.

Next, the change point detection unit 102 acquires data (second data) of a second data series from the data accumulation unit 101 (step S1003). In the present example, the second data series will be described as wireless terminal position data estimated using a wireless sensor.

FIG. 6 is an example of the second data series acquired in step S1003. As illustrated in FIG. 6, in the present example, the second data series is a data group including information on times, positions, and MAC addresses. That is, in the second data series, data in which times, positions, and MAC addresses are associated with each other are arranged in time series. The time is a time at which position data is generated, and is described as the number of seconds elapsed from 0:00 on Jan. 1, 1970 as in FIG. 4. In the present example, it is assumed that position data is generated at a cycle of 10 seconds. The MAC address (second identifier) is an identifier for uniquely identifying a wireless terminal of which a position has been estimated. It can also be said that the second data series includes detection data (a position of the second identifier) associated with the second identifier. Although only one type of MAC address is described here for the sake of explanation, data on a plurality of MAC addresses may be included in practice.

Next, the change point detection unit 102 also detects change points of the second data on the basis of a detection method selected by the detection method selection unit 103 (step S1004). Here, the detection method selection unit 103 selects a change point detection method on the basis of the first data series and the second data series. That is, a method of detecting a change point for a positioning data series depending on the position of the camera indicated by the camera ID of the first data series is adopted.

Figure 7A:
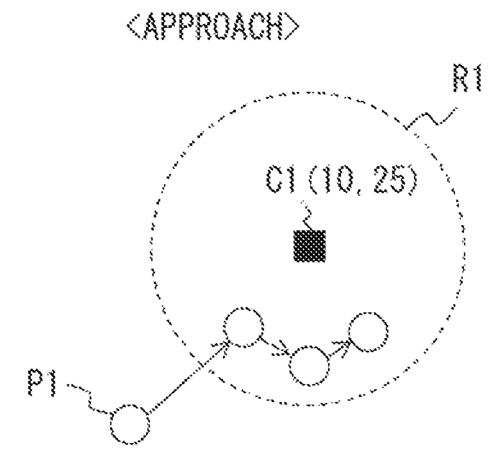
FIG. 7A is a diagram illustrating a method of detecting a change point of a second data series according to the first example embodiment.
Figure 7B:
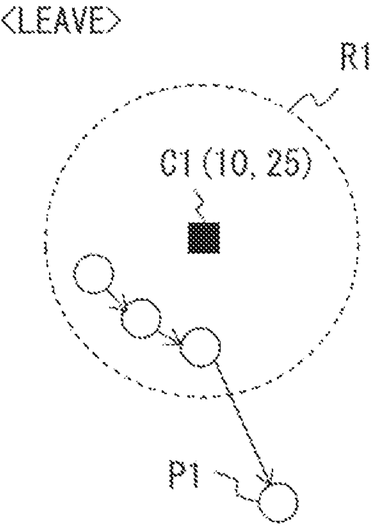
FIG. 7B is a diagram illustrating a method of detecting a change point of a second data series according to the first example embodiment.
Figure 7C:
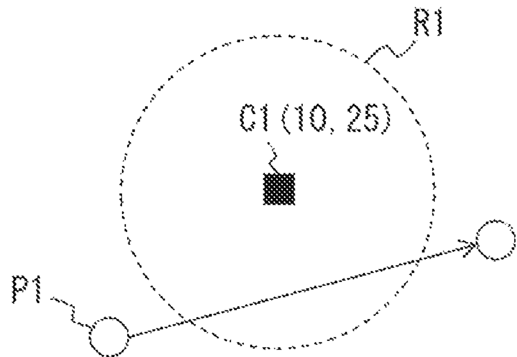
FIG. 7C is a diagram illustrating a method of detecting a change point of a second data series according to the first example embodiment.

FIGS. 7A to 7C are diagrams each illustrating a method of detecting a change point of the second data series according to the present example embodiment. In FIGS. 7A to 7C, a dotted circle with a camera C1 at the center thereof indicates an imaging range R1 of the camera C1. It is assumed that the camera C1 is located at a position (10,25) (unit is meter), and the imaging range R1 is 5 m from C1. Further, solid circles indicate time-series transitions of wireless positioning data (position P1) related to a terminal having a certain MAC address (here, AA:BB:CC:DD:EE:FF). Concerning the second data series, similarly to the first data series, three types of change points of "approach", "leave", and "pass" are detected.

In this case, the change in state of data detected as a change point is a change in detection data (position). The change point detection unit 102 detects a time at which the position of the second data series has changed as a change point, and determines a change type of the change point according to the change in position. The change in state of data to be detected is a change in position (between the inside of the imaging range and the outside of the imaging range) with respect to the boundary of the imaging range R1 of the camera C1. It can also be said that the imaging range R1 is an area where data for generating a first data series can be acquired.

FIG. 7A illustrates a method of detecting a change point of "approach", in which a time at which the position P1 of the wireless positioning has entered the imaging range R1 of the camera C1 from the outside of the range R1 is detected as a change point. For example, referring to the example of FIG. 6, the time "1601379130" is a change point of "approach", because the position changes from (10,10) (position outside R1) to (10,28) (position inside R1) at the time "1601379130". FIG. 7B illustrates a method of detecting a change point of "leave", in which a time at which the position P1 of the wireless positioning has exited the imaging range R1 of the camera C1 from the inside of the range R1 is detected as a change point. Referring to the example of FIG. 6, the time "1601379170" is a change point of "leave", because the position changes from (10,28) to (10, 10) at the time "1601379170". FIG. 7C illustrates a method of detecting a change point of "pass". In FIG. 7C, although the data on the position P1 of the wireless positioning indicates that the position P1 is not directly within the imaging range R1 of the camera C1, the position P1 changes across the imaging range R1 of the camera C1 when the data on the position P1 is interpolated with a straight line or the like. FIG. 8 is a diagram illustrating an example of a change point detected from the second data series of FIG. 6.

Next, the identifier association unit 104 extracts change points occurring within a predetermined time difference among the change points of the first data series and the change points of the second data series as synchronous change points (step S1005). When the change points have types, only change points of the same type are extracted. Here, the predetermined time difference is set to 10 seconds. Referring to the examples of FIGS. 5 and 8, for example, since both data at the time "1601379163" in FIG. 5 and data at the time "1601379170" in FIG. 8 correspond to change points of "leave" and the time difference between the time "1601379163" and the time "1601379170" is within 10 seconds, they are detected as synchronous change points. At this time, it is assumed that the identifier ID "U1" and the MAC address "AA:BB:CC:DD:EE:FF" are synchronized.

Next, the identifier association unit 104 calculates a probability that synchronous change points occur, and compares the calculated occurrence probability with a first threshold (step S1006). The probability that synchronous change points occur is, for example, a ratio of a total number of synchronous change points including change points of the first data series and change points of the second data series within the predetermined time range to a total number of detected change points of the first data series. Specifically, it is assumed that the total number of detected change points for the identifier ID "U1" in the first data series was counted as N1. Thereafter, it is assumed that the total number of synchronous change points for the identifier ID "U1" in the first data series and the MAC address "AA:BB:CC:DD:EE:FF" in the second data series was counted as N2. In that case, the probability that synchronous change points occur is calculated as N2/N1.

When the calculated occurrence probability is greater than the first threshold (or is equal to or greater than the first threshold) (Yes in step S1007), the identifier association unit 104 links the identifiers of the detected synchronous change points with each other (step S1008). That is, the identifier of the first data and the identifier of the second data are associated with each other. In the present example, it is determined that a person whose identifier ID is "U1" owns a wireless terminal whose MAC address is "AA:BB:CC:DD:EE:FF". When the occurrence probability is equal to or smaller than the first threshold (No in step S1007), the process ends without associating identifiers.

Note that, although one identifier of the second data series is linked with one identifier of the first data series in the present example embodiment, a plurality of identifiers may be linked with each other. That is, in a case where a plurality of second identifiers are included in the second data series, a probability that synchronous change points occur may be calculated for each of the second identifiers, and the first identifier and the plurality of second identifiers may be associated with each other based on a result of comparing each calculated occurrence probability with the first threshold. For example, it may be determined that a person whose identifier ID is "U1" owns a wireless terminal whose MAC address is "AA:BB:CC:DD:EE:FF" and a wireless terminal whose MAC address is "AA:BB:CC:DD:EE:F0". By doing so, it is possible to cope with a case where one person owns a plurality of wireless terminals.

After it is determined that a person whose identifier ID is "U1" owns a wireless terminal whose MAC address is "AA:BB:CC:DD:EE:FF" in step S1008, the terminal type determination unit 105 compares the probability that synchronous change points occur calculated in step S1006 with a second threshold (step S1009).

When it is determined that the occurrence probability is greater than the second threshold (or is equal to or greater than the second threshold) (Yes in step S1010), the terminal type determination unit 105 determines the type of the terminal corresponding to the identifier as a first type (step S1011). In this example, the type of the wireless terminal is determined as a mobile terminal that is always carried, such as a smartphone. When it is determined that the occurrence probability is equal to or smaller than the second threshold (or smaller than the second threshold) (No in step S1010), the terminal type determination unit 105 determines the type of the terminal corresponding to the identifier as a second type (step S1012). In this example, the type of the wireless terminal is determined as a non-mobile terminal that is not always carried, such as a laptop computer or a desktop computer. In a case where a plurality of second identifiers are associated with the first identifier, a terminal type may be determined for each of the second identifiers. When the data association device 100 associates each identifier of data and determines a terminal type of the identifier, the trace system traces a position of the user according to the data of the associated identifier on the basis of the determined terminal type.

Effects of First Example Embodiment

As described above, in the present example embodiment, focused on data change points in a data series, synchronized change points are statistically aggregated, and identifiers are associated with each other on the basis of a synchronization occurrence probability. Therefore, for example, even if a user does not always carry a wireless terminal, it is possible to prevent erroneous association. In addition, since change points are linked with each other by type, a plurality of change points can be determined in an integrated manner, thereby improving linking accuracy.

In the present example embodiment, two thresholds are used for the synchronization occurrence probability. This is to determine the type of the terminal owned by the user. For example, as types of terminals, there are a terminal that is always carried by the user, such as a smartphone or a smart watch, and a terminal that is highly frequently placed on a desk when the user moves, such as a notebook PC. The terminal that is always carried by the user has a high probability of synchronization, and the terminal that is not necessarily carried by the user has a lower probability of synchronization than the terminal that is always carried by the user. Therefore, by setting the thresholds for synchronous change points in two stages, it is possible to distinguish the two types of terminals from each other.

According to the present example embodiment, not only a plurality of types of data caused by the same user can be accurately linked with each other, but also an attribute of the data (such as data from a terminal that is always carried) can be simultaneously determined.

In determining a terminal type, only one threshold is set in the present example embodiment, but a plurality of thresholds may be set. For example, the terminal may be determined as a smart watch (a mobile terminal having higher mobility) when the occurrence probability exceeds the largest threshold (third threshold), the terminal may be determined as a smartphone (a mobile terminal having lower mobility) when the occurrence probability is equal to or smaller than the third threshold and equal to or greater than the second threshold, and the terminal may be determined as a notebook computer (a non-mobile terminal) otherwise. By doing so, it is possible to more finely classify the types of terminals.

In addition, in the present example embodiment, the example in which a terminal type is determined using the threshold has been described, but it is not always necessary to use the threshold, and a continuously changing attribute value of the terminal may be calculated. For example, a probability that the user carries a terminal while moving may be calculated from the probability that synchronous change points occur. By doing so, it is possible to more finely classify the second data series.

Second Example Embodiment

Next, a second example embodiment will be described. In the present example embodiment, in a case where a plurality of second identifiers (e.g., MAC addresses) of a second data series (e.g., wireless positioning data) is linked with a first identifier (e.g., a user name) of a first data series (e.g., a camera), it is determined which data of the second data series is used on the basis of an attribute (e.g., a terminal that is always carried) for each of the second identifiers of the second data series. In a case where a position of a user is tracked, accuracy in tracking the user is higher by using a position of a terminal that is always carried, such as a smartphone or a smartwatch, than by using information from a terminal that is often left on a desk when the user leaves his/her seat, such as a notebook PC or a desktop PC.

Figure 9:
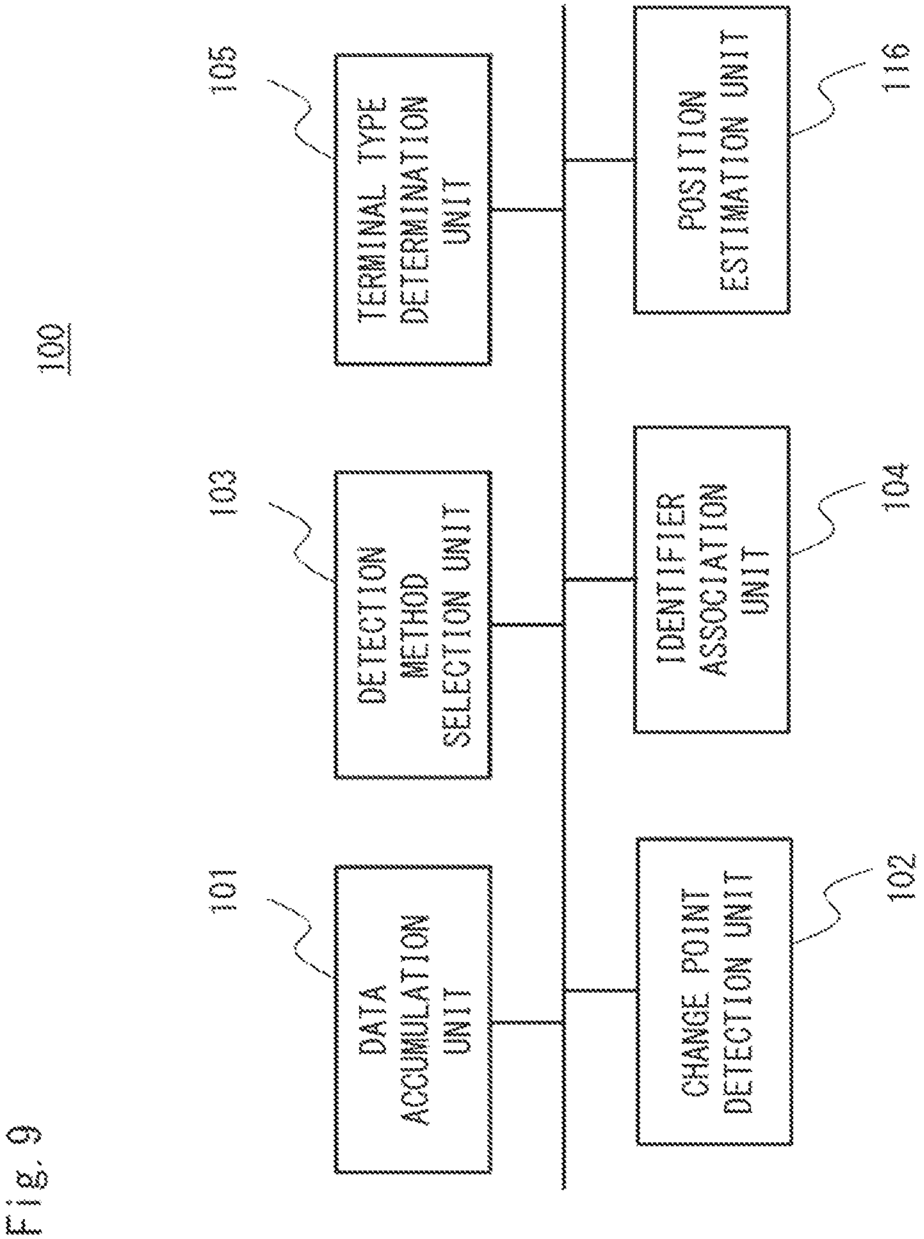
FIG. 9 is a configuration diagram illustrating an example of a configuration of a data association device according to a second example embodiment.

An example of a configuration of a data association device 100 according to the present example embodiment will be described with reference to FIG. 9. As illustrated in FIG. 9, the data association device 100 according to the present example embodiment includes a data accumulation unit 101, a change point detection unit 102, a detection method selection unit 103, an identifier association unit 104, a terminal type determination unit 105, and a position estimation unit 116. Note that since the configuration other than the position estimation unit 116 is the same as that of the first example embodiment, the description thereof will be omitted.

The position estimation unit (data selection unit) 116 selects position information to be used for tracing, on the basis of a terminal type determined by the terminal type determination unit 105, from a second data series including a plurality of pieces of position information (data on a second identifier) linked with a specific identifier (a first identifier) of the first data series.

Next, an example of an operation of the data association device according to the present example embodiment will be described with reference to FIG. 10. Since the operations from step S1001 to step S1012 are the same as those in the first example embodiment, the detailed description thereof will be omitted. Note that, in this example, it is assumed that the identifier ID "U1" in the first data series is linked with the MAC addresses "AA:BB:CC:DD:EE:FF" and "AA:BB:CC:DD:EE:F0" that are positioning data as identifiers of the second data series in the operations up to step S1008. In the operations up to step S1012, it is assumed that the terminal type of "AA:BB:CC:DD:EE:FF" is determined as a smartphone (first type), and the terminal type of "AA:BB:CC:DD:EE:F0" is determined as a notebook PC (second type).

Thereafter, on the basis of the terminal types determined in steps S1011 and S1012, the position estimation unit 116 selects which identifier (MAC address) of positioning data from the second data series is to be used for tracing (step S1113). In this example, for example, it is determined to use the positioning data "AA:BB:CC:DD:EE:FF" determined as a smartphone (first type). When the data association device 100 selects positioning data, the trace system traces a position of the user by using the selected positioning data.

As described above, in the present example embodiment, in a case where the same user owns a plurality of terminals, the types of the terminals are determined, and it is determined which terminal is to be adopted to obtain position information on the basis of the types of the terminals, thereby making it possible to track the user with high accuracy.

Note that the present disclosure is not limited to the above-described example embodiments, and can be appropriately modified without departing from the gist.

Figure 11:
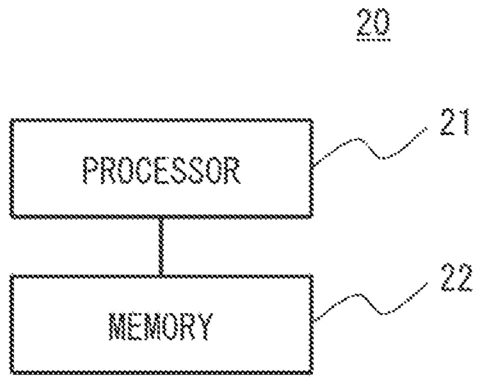
FIG. 11 is a configuration diagram illustrating an example of a hardware configuration of a computer according to an example embodiment.

The configuration in each of the above-described example embodiments may be implemented by hardware, software, or both, and may be implemented by one piece of hardware or software or by a plurality of pieces of hardware or software. Each device and each function (process) may be realized by a computer 20 including a processor 21 such as a central processing unit (CPU) and a memory 22 which is a storage device as illustrated in FIG. 11. For example, programs for performing the methods (data processing methods) in the example embodiments may be stored in the memory 22 and the functions may be realized by the processor 21 executing the programs stored in the memory 22.

These programs can be stored and supplied to the computer using various types of non-transitory computer-readable media. The non-transitory computer readable media include various types of tangible storage media. Examples of non-transitory computer readable media include a magnetic recording medium (e.g., a flexible disk, a magnetic tape, or a hard disk drive), a magneto-optical recording medium (e.g., a magneto-optical disk), a CD-read only memory (ROM), a CD-R, a CD-R/W, and a semiconductor memory (e.g., a mask ROM, a programmable ROM (PROM), an erasable PROM (EPROM), a flash ROM, and a random access memory (RAM). In addition, the programs may be supplied to the computer by various types of transitory computer readable media. Examples of transitory computer readable media include electrical signals, optical signals, and electromagnetic waves. The transitory computer readable media can supply the programs to the computer via wired or wireless communication paths such as wires and optical fiber.

Although the present disclosure has been described above with reference to the example embodiments, the present disclosure is not limited to the above-described example embodiments. Various modifications that can be understood by those skilled in the art can be made to the configuration and details of the present disclosure within the scope of the present disclosure.

Some or all of the above-described example embodiments can be described as in the following supplementary notes, but are not limited to the following supplementary notes.

(Supplementary Note 1)

A data processing device including:

- a detection means for detecting change points of a first data series including a first identifier and change points of a second data series including a second identifier;
- a calculation means for calculating an occurrence probability that the change points of the first data series and the change points of the second data series occur in synchronization with each other;
- an association means for associating the first identifier and the second identifier as identifiers related to a tracing target on the basis of the occurrence probability; and
- a determination means for determining a type of an identification target of the associated first or second identifier on the basis of the occurrence probability.

(Supplementary Note 2)

The data processing device according to supplementary note 1, in which the detection means detects the change points of the first data series on the basis of a first detection method corresponding to the first data series, and detects the change points of the second data series on the basis of a second detection method corresponding to the second data series.

(Supplementary Note 3)

The data processing device according to supplementary note 2, further including a detection method selection means configured to select the first detection method according to a type of the first data series and select the second detection method according to a type of the second data series.

(Supplementary Note 4)

The data processing device according to any one of supplementary notes 1 to 3, in which the detection means detects a time at which a state of data has changed in the first or second data series as a change point.

(Supplementary Note 5)

The data processing device according to supplementary note 4, in which the detection means determines a change type of the change point according to the change in the state of the data.

(Supplementary Note 6)

The data processing device according to supplementary note 4 or 5, in which

- the first or second identifier is an identifier indicating an identification target identified by a predetermined identification process from data for generating the first or second data series, and
- the change in the state of the data is a change in identification state of the identification target identified by the identification process.

(Supplementary Note 7)

The data processing device according to supplementary note 6, in which the change in the identification state is a change as to whether the identification target is identified by the identification process.

(Supplementary Note 8)

The data processing device according to supplementary note 6 or 7, in which the identification process is a process of recognizing the identification target from an image captured by a camera.

(Supplementary Note 9)

The data processing device according to supplementary note 4 or 5, in which

- the first or second data series includes detection data associated with the first or second identifier, and
- the change in the state of the data is a change in the detection data.

(Supplementary Note 10)

The data processing device according to supplementary note 9, in which

- the detection data is data indicating a position of an identification target of the first or second identifier, and
- the change in the state of the data is a change in position of the detection data with respect to a boundary of a predetermined area.

(Supplementary Note 11)

The data processing device according to any one of supplementary notes 1 to 10, in which the occurrence probability is a probability that the change points of the first data series and the change points of the second data series occur within a predetermined time range.

(Supplementary Note 12)

The data processing device according to supplementary note 11, in which the occurrence probability is a ratio of a total number of synchronous change points including the change points of the first data series and the change points of the second data series within the predetermined time range to a total number of the detected change points of the first data series.

(Supplementary Note 13)

The data processing device according to any one of supplementary notes 1 to 12, in which the association means associates the first identifier and the second identifier when the occurrence probability is greater than a first threshold.

(Supplementary Note 14)

The data processing device according to any one of supplementary notes 1 to 13, in which the determination means determines the type of the identification target of the first identifier or the second identifier based on a result of comparing the occurrence probability with a second threshold.

(Supplementary Note 15)

The data processing device according to supplementary note 14, in which when the occurrence probability is greater than the second threshold, the determination means determines that the identification target of the first identifier or the second identifier is a mobile device.

(Supplementary Note 16)

The data processing device according to any one of supplementary notes 1 to 15, in which the second data series includes a plurality of the second identifiers, and the association means associates the first identifier with the plurality of second identifiers.

(Supplementary Note 17)

The data processing device according to supplementary note 16, further including a data selection means configured to select data on a second identifier to be used for tracing from data on the plurality of associated second identifiers on the basis of the determined terminal type.

(Supplementary Note 18)

A data processing method including:

detecting change points of a first data series including a first identifier and change points of a second data series including a second identifier;

calculating an occurrence probability that the change points of the first data series and the change points of the second data series occur in synchronization with each other;

associating the first identifier and the second identifier as identifiers related to a tracing target on the basis of the occurrence probability; and determining a type of an identification target of the associated first or second identifier on the basis of the occurrence probability.

(Supplementary Note 19)

A non-transitory computer readable medium storing a data processing program for causing a computer to execute:

detecting change points of a first data series including a first identifier and change points of a second data series including a second identifier;

calculating an occurrence probability that the change points of the first data series and the change points of the second data series occur in synchronization with each other;

associating the first identifier and the second identifier as identifiers related to a tracing target on the basis of the occurrence probability; and determining a type of an identification target of the associated first or second identifier on the basis of the occurrence probability.

REFERENCE SIGNS LIST

10 DATA PROCESSING DEVICE
11 DETECTION UNIT
12 CALCULATION UNIT
13 ASSOCIATION UNIT
14 DETERMINATION UNIT
20 COMPUTER
21 PROCESSOR
22 MEMORY
100 DATA ASSOCIATION DEVICE
101 DATA ACCUMULATION UNIT
102 CHANGE POINT DETECTION UNIT
103 DETECTION METHOD SELECTION UNIT
104 IDENTIFIER ASSOCIATION UNIT
105 TERMINAL TYPE DETERMINATION UNIT
116 POSITION ESTIMATION UNIT

What is claimed is:

1. A data processing device comprising:

at least one memory storing instructions, and at least one processor configured to execute the instructions stored in the at least one memory to;

detect change points of a first data series including a first identifier and change points of a second data series including a second identifier;

calculate an occurrence probability that the change points of the first data series and the change points of the second data series occur in synchronization with each other;

associate the first identifier and the second identifier as identifiers related to a tracing target when the occurrence probability is greater than a first threshold; and determine a type of an identification target of the associated first or second identifier on the basis of the occurrence probability.

2. The data processing device according to claim 1, wherein the at least one processor is further configured to execute the instructions stored in the at least one memory to detect the change points of the first data series on the basis of a first detection method corresponding to the first data series, and detect the change points of the second data series on the basis of a second detection method corresponding to the second data series.

3. The data processing device according to claim 2, wherein the at least one processor is further configured to execute the instructions stored in the at least one memory to select the first detection method according to a type of the first data series and select the second detection method according to a type of the second data series.

4. The data processing device according to claim 1, wherein the at least one processor is further configured to execute the instructions stored in the at least one memory to detect a time at which a state of data has changed in the first or second data series as a change point.

5. The data processing device according to claim 4, wherein the at least one processor is further configured to execute the instructions stored in the at least one memory to determine a change type of the change point according to the change in the state of the data.

6. The data processing device according to claim 4, wherein the first or second identifier is an identifier indicating an identification target identified by a predetermined identification process from data for generating the first or second data series, and the change in the state of the data is a change in identification state of the identification target identified by the identification process.

7. The data processing device according to claim 6, wherein the change in the identification state is a change as to whether the identification target is identified by the identification process.

8. The data processing device according to claim 6, wherein the identification process is a process of recognizing the identification target from an image captured by a camera.

9. The data processing device according to claim 4, wherein the first or second data series includes detection data associated with the first or second identifier, and the change in the state of the data is a change in the detection data.

10. The data processing device according to claim 9, wherein the detection data is data indicating a position of an identification target of the first or second identifier, and the change in the state of the data is a change in position of the detection data with respect to a boundary of a predetermined area.

11. The data processing device according to claim 1, wherein the occurrence probability is a probability that the change points of the first data series and the change points of the second data series occur within a predetermined time range.

12. The data processing device according to claim 11, wherein the occurrence probability is a ratio of a total number of synchronous change points including the change points of the first data series and the change points of the second data series within the predetermined time range to a total number of the detected change points of the first data series.

13. The data processing device according to claim 1, wherein the at least one processor is further configured to execute the instructions stored in the at least one memory to determine the type of the identification target of the first identifier or the second identifier based on a result of comparing the occurrence probability with a second threshold.

14. The data processing device according to claim 13, wherein the at least one processor is further configured to execute the instructions stored in the at least one memory to, when the occurrence probability is greater than the second threshold, determine that the identification target of the first identifier or the second identifier is a mobile device.

15. The data processing device according to claim 1, wherein the second data series includes a plurality of the second identifiers, and the at least one processor is further configured to execute the instructions stored in the at least one memory to associate the first identifier with the plurality of second identifiers.

16. The data processing device according to claim 15, wherein the at least one processor is further configured to execute the instructions stored in the at least one memory to select data on a second identifier to be used for tracing from data on the plurality of associated second identifiers on the basis of the determined terminal type.

17. A data processing method comprising:

detecting change points of a first data series including a first identifier and change points of a second data series including a second identifier;

calculating an occurrence probability that the change points of the first data series and the change points of the second data series occur in synchronization with each other;

associating the first identifier and the second identifier as identifiers related to a tracing target when the occurrence probability is greater than a first threshold; and determining a type of an identification target of the associated first or second identifier on the basis of the occurrence probability.

18. A non-transitory computer readable medium storing a data processing program for causing a computer to execute:

detecting change points of a first data series including a first identifier and change points of a second data series including a second identifier;

calculating an occurrence probability that the change points of the first data series and the change points of the second data series occur in synchronization with each other;

associating the first identifier and the second identifier as identifiers related to a tracing target when the occurrence probability is greater than a first threshold; and determining a type of an identification target of the associated first or second identifier on the basis of the occurrence probability.

* * * * *